United States Patent
Song (10) Patent No.: US 12,449,708 B2
(45) Date of Patent: Oct. 21, 2025

(54) LIGHT PATH CONTROL DEVICE

(71) Applicant: LG DISPLAY CO., LTD., Seoul (KR)

(72) Inventor: Youngki Song, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 332 days.

(21) Appl. No.: 18/219,321

(22) Filed: Jul. 7, 2023

(65) Prior Publication Data

US 2024/0126133 A1 Apr. 18, 2024

(30) Foreign Application Priority Data

Oct. 12, 2022 (KR) .......................... 10-2022-0130136

(51) Int. Cl.
*G02F 1/29* (2006.01)
(52) U.S. Cl.
CPC ...................................... *G02F 1/29* (2013.01)

(58) Field of Classification Search
CPC ........................................................ G02F 1/29
See application file for complete search history.

(56) References Cited

U.S. PATENT DOCUMENTS

2016/0353097 A1* 12/2016 Fang ................... H04N 13/356
2021/0055582 A1* 2/2021 Chen ................... G02F 1/13362

FOREIGN PATENT DOCUMENTS

| KR | 10-2015-0078196 A | 7/2015 |
| KR | 10-2018-0068293 A | 6/2018 |

* cited by examiner

*Primary Examiner* — Edmond C Lau
(74) *Attorney, Agent, or Firm* — PnK IP LLC (57) ABSTRACT

A light path control device includes a substrate, a first viewing angle control member on the substrate comprising a first electrode, a second electrode, and a liquid crystal layer between the first electrode and the second electrode, and a second viewing angle control member on the first viewing angle control member comprising light shielding patterns patterned at predetermined intervals.

14 Claims, 13 Drawing Sheets

LIGHT PATH CONTROL DEVICE

CROSS-REFERENCE TO RELATED APPLICATION

The present application claims the priority of Korean Patent Application No. 10-2022-0130136, filed on Oct. 12, 2022, which is hereby incorporated by reference in its entirety.

BACKGROUND

Field of the Disclosure

The present disclosure relates to a light path control device.

Description of the Background

Dimming films may function as a light path control device that controls the path of light by manipulating the direction of light according to the incident angle of external light, blocking light in a specific direction and transmitting light in another specific direction. Such dimming films are attached to display devices such as mobile phones, laptops, tablet PCs, and car navigation systems, and adjust the optical viewing angle when images are displayed, allowing for clear picture quality to be achieved within a specific viewing angle.

As an example of dimming films, a method of controlling the path of light using the arrangement of polymer-dispersed liquid crystal (PDLC) is being utilized. Liquid crystal dimming films have the disadvantage of difficulty in achieving true black in the image due to the scattering of some light by the liquid crystal, which may result in a degradation of image quality, as well as an inability to utilize side light.

The above information disclosed in this Background section is only for enhancement of understanding of the background of the described technology and therefore it may contain information that does not form prior art that is already known to a person of ordinary skill in the art.

SUMMARY

Accordingly, the present disclosure relates to a light path control device that implements a private mode and a share mode using a viewing angle control member including liquid crystal and a viewing angle control member including a blocking pattern.

The present disclosure also relates to a light path control device that implements a private mode and a share mode through side light control.

A light path control device according to an aspect includes a substrate, a first viewing angle control member formed on the substrate and comprising a first electrode, a second electrode, and a liquid crystal layer interposed between the first electrode and the second electrode, and a second viewing angle control member formed on the first viewing angle control member and comprising light shielding patterns patterned at predetermined intervals.

The liquid crystal layer may be configured, in a first mode, to have a first refractive index equal to that of the substrate and transmit a first side light incident through the substrate without refraction and, in a second mode, to have a second refractive index greater than that of the substrate and refract a second side light incident through the substrate adjacent to a normal line of the first viewing angle control member and transmit the refracted light.

The first side light transmitted through the first viewing angle control member in the first mode may be restricted in lateral emission thereof by the light shielding patterns of the second viewing angle control member, restricting a side viewing angle.

The second side light transmitted through the first viewing angle control member in the second mode may be emitted to a top surface through a gap between the light shielding patterns of the second viewing angle control member.

The second viewing angle control member may include a pattern cover layer covering the light shielding patterns, the pattern cover layer having a refractive index greater than that of the outside of the light path control device.

The second side light emitted to the top surface may be emitted toward the sides of the light path control device, opening a side viewing angle.

The liquid crystal layer may include liquid crystal molecules, which may be aligned in a horizontal direction in the first mode and rotate, in the second mode, about a predetermined axis to be aligned in a vertical direction.

The liquid crystal molecules may be aligned at an arbitrary angle between the horizontal direction and the vertical direction based on the strength of an electric field between the first and second electrodes.

The liquid crystal layer may have the second refractive index for a third side light incident parallel to a long axis of the liquid crystal molecules aligned at the arbitrary angle based on the electric field being applied, and the first refractive index for a fourth side light incident perpendicular to the long axis of the liquid crystal molecules aligned at the arbitrary angle.

The first electrode may be configured in the form of a planar electrode and the second electrode may be configured to include a plurality of patterns spaced apart from each other on a plane.

The plurality of patterns may be applied with different polarities of voltage, and the liquid crystal molecules may be tilted to one side or the other side based on a direction of an electric field between the plurality of patterns and the second electrode.

The liquid crystal layer may include a plurality of refractive patterns formed on the top surface thereof.

The plurality of refractive patterns may have a semicircular or triangular cross-section.

The first viewing angle control member may further include a base layer disposed on a top surface of the second electrode.

The light path control device may further include an adhesive member bonding the first viewing angle control member and the second viewing angle control member, wherein the adhesive member may have a refractive index equal to that of the base layer.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Hereinafter, aspects will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that may be defined by associated components.

The terms "first," "second," etc. are used to describe various components, but the components should not be limited by these terms. The terms are used only for distinguishing one component from another component. For example, a first component may be referred to as a second component and, similarly, the second component may be referred to as the first component, without departing from the scope of the present disclosure. As used herein, the singular forms are intended to include the plural forms as well, unless the context clearly indicates otherwise.

The terms such as "below," "lower," "above," "upper," etc. are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

Figure 1:
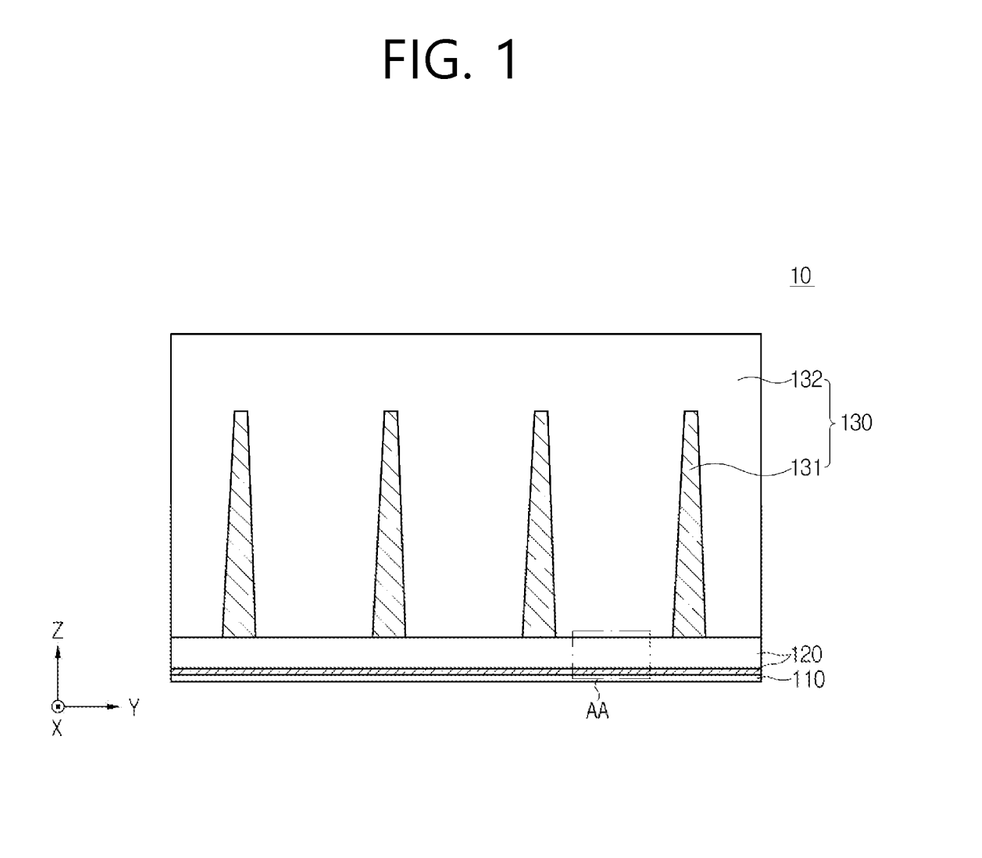
FIG. 1 is a cross-sectional view of a light path control device according to an aspect of the present disclosure.
Figure 2:
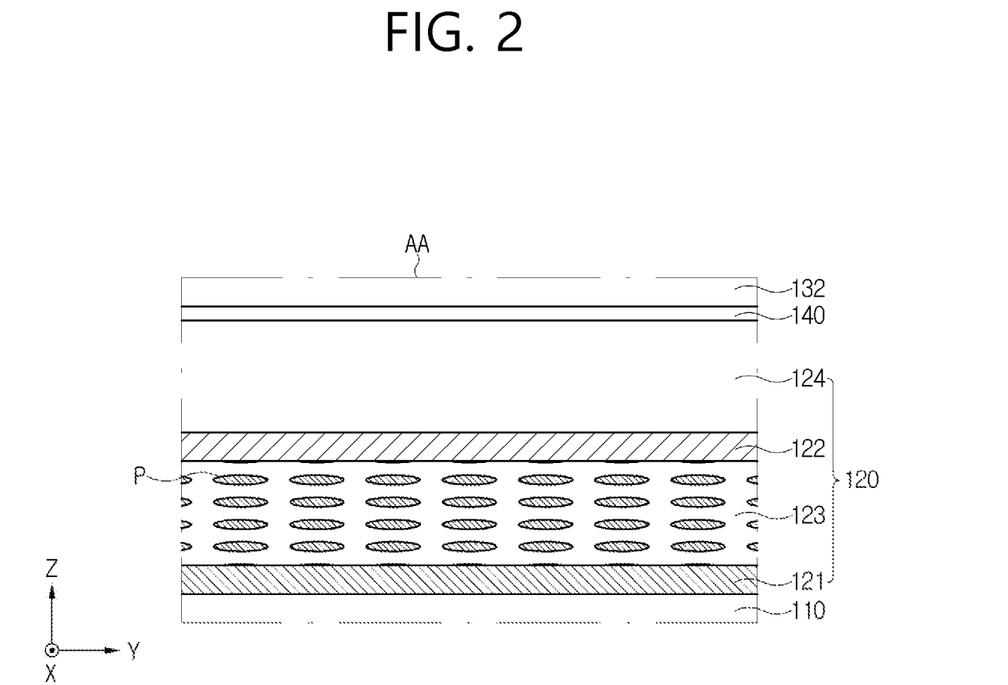
FIG. 2 is an enlarged view of area AA in FIG. 1.

FIG. 1 is a cross-sectional view of a light path control device according to an aspect. FIG. 2 is an enlarged view of area AA in FIG. 1.

With reference to FIG. 1, a light path control device 10 may include a substrate 110, a first viewing angle control member 120, a second viewing angle control member 130.

The substrate 110 may be a transparent substrate and serve as a base material of the light path control device 10. The substrate 110 may be a rigid substrate including glass or tempered glass or a flexible substrate made of a plastic material. For example, the substrate 110 may be a flexible polymer film made of one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC), polyvinyl alcohol (PVA), Polyimide (PI), and polystyrene (PS). However, the material of the substrate 110 is not limited thereto.

In one aspect, when the light path control device is applied to a display device or the like, the substrate 110 may be omitted.

The first viewing angle control member 120 is disposed on the substrate 110. The first viewing angle control member 120 may control the direction of light incident on the bottom surface of the light path control device 10.

With reference to FIGS. 1 and 2, the first viewing angle control member 120 may include a first electrode 121, a second electrode 122, and a liquid crystal layer 123 interposed therebetween.

The first electrode 121 may be composed of a transparent conductive material. For example, the first electrode 121 may be formed of indium tin oxide (ITO), indium zinc oxide (IZO), copper oxide, tin oxide, zinc oxide (ZnO), or titanium oxide. In an aspect, the optical transmittance of the first electrode 121 may be about 80% or more.

The second electrode 122 may be composed of a transparent conductive material. The second electrode 122 may be composed of a material identical or similar to that of the first electrode 121. The second electrode 122 is disposed to overlap with the first electrode 121. Accordingly, when a voltage is applied to the first electrode 121 and the second electrode 122, an electric field may be formed between them.

The liquid crystal layer 123 may include liquid crystal molecules P. The liquid crystal molecules P are aligned in an initial molecular orientation via an alignment film (not shown) and, when an electric field is formed between the first and second electrodes 121 and 122, realigned in a predetermined molecular orientation according to the direction of the electric field. As a result, the refractive index of the liquid crystal layer 123 changes. As a result of the change in refractive index of the liquid crystal layer 123, the outgoing path of light entering from the substrate 110 to the first viewing angle control member 120 may be controlled.

For example, when no voltage is applied to the first electrode 121 and the second electrode 122, the liquid crystal molecules P are aligned in the initial molecular orientation, and the refractive index of the liquid crystal layer 123 may be identical or similar to that of the substrate 110. As a result, the first viewing angle control member 120 may refract and transmit the light entering through the substrate 110 as it is or at a small angle.

For example, the light incident generally perpendicular to the bottom surface of the first viewing angle control member 120 (rear light) may be emitted generally perpendicular to the top surface of the first viewing angle control member 120. The light incident obliquely to the bottom surface of the first viewing angle control member 120 (side light) may be emitted obliquely to the top surface of the first viewing angle control member 120.

In contrast, when a voltage is applied to the first electrode 121 and the second electrode 122, the liquid crystal molecules P are aligned in the direction of the electric field, and the refractive index of the liquid crystal layer 123 may be controlled to be greater than that of the substrate 110. In this case, the first viewing angle control member 120 may refract the light incident from the substrate 110 adjacent to the normal line (a line perpendicular to the top surface).

For example, the light incident generally perpendicular to the bottom surface of the first viewing angle control member 120 (rear light) may be emitted generally perpendicular to the top surface of the first viewing angle control member 120. The light incident obliquely on the bottom surface of the first viewing angle control member 120 (side light) may be refracted greatly in the direction of the normal line (generally upward direction) and emitted obliquely. Here, the refraction angle of the side light may be determined by the refractive index ratio between the first viewing angle control member 120 and the substrate 110 and may be controlled within a narrow angle range with respect to the normal line.

In an aspect, the first viewing angle control member 120 may further include a base layer 124 disposed on the top surface of the second electrode 122. The base layer 124 may protect and support the components thereunder and may flatten the top surface of the first viewing angle control member 120. The base layer 124 may be formed of polymers such as PET.

The second viewing angle control member 130 is disposed on the first viewing angle control member 120. The second viewing angle control member 130 may control the direction of the light emitted from the first viewing angle control member 120.

The second viewing angle control member 130 may include a light shielding pattern 131 patterned at regular intervals on the substrate 110. The light shielding pattern 131 may have a bar shape elongated along the thickness direction (Z-axis direction) of the second viewing angle control member 130.

The light shielding pattern 131 may have a constant or variable width from one side adjacent to the first viewing angle control member 120 to the opposite side. For example, the light shielding pattern 131 may have a cross-section of a trapezoidal shape of which one side adjacent to the first viewing angle control member 120 is wider in width than the opposite side, as shown in FIG. 1. However, the profile is not limited to this aspect, the light shielding pattern 131 may be formed with an entirely uniform width in various other aspects.

The light shielding pattern 131 may be formed in a shape that penetrates or does not penetrate the second viewing angle control member 130. The light shielding pattern 131 may be made of colored optical absorption material. For example, the light shielding pattern 131 may be composed of electronic ink containing black particles.

The light path entering through the second viewing angle control member 130 is open to the front through the gaps between the light shielding patterns 131, and is blocked by the light shielding patterns 131 on the sides. Therefore, the light entering the second viewing angle control member 130 may be controlled within a narrow angle range with respect to the top surface of the second viewing angle control member 130.

A pattern cover layer 132 may protect the light shielding pattern 131 and flatten the top surface of the second viewing angle control member 130 by removing any unevenness caused by the light shielding pattern 131. The pattern cover layer 132 may be made of a transparent material with high transmittance, such as polyethylene terephthalate (PET), polycarbonate (PC), optical clear adhesive (OCA), ultraviolet (UV) resin, photoresist resin, polyurethane resin, acrylic resin, silicon oxide, or a combination of two or more of them. The pattern cover layer 132 may allow the incident light to emit in the opposite direction, i.e., to the outside of the light path control device 10.

In an aspect, the pattern cover layer 132 may be configured to have a refractive index higher than that of the air outside of the light path control device 10. Accordingly, the light obliquely emitted from the pattern cover layer 132 (side light) is further refracted adjacent to the lateral direction of the light path control device 10, allowing for wider control of the viewing angle.

The second viewing angle control member 130 may be attached to the first viewing angle control member 120 via an adhesive material 140 such as an optically clear adhesive (OCA). Here, the adhesive material 140 may be composed of a resin with the same refractive index as that of the base layer 124 of the first viewing angle control member 120.

Hereinafter, a description is made of the method for implementing the private mode and the share mode using the above-described light path control device 10 in detail.

Figure 3:
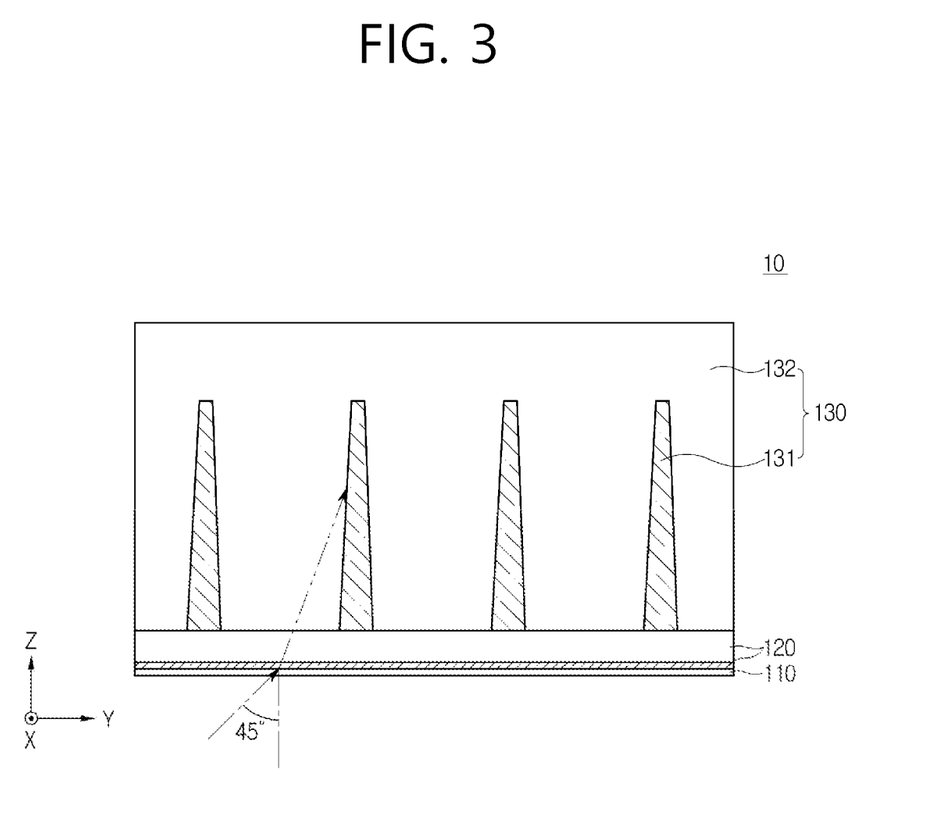
FIG. 3 illustrates a light path for a light path control device in a private mode.
Figure 4:
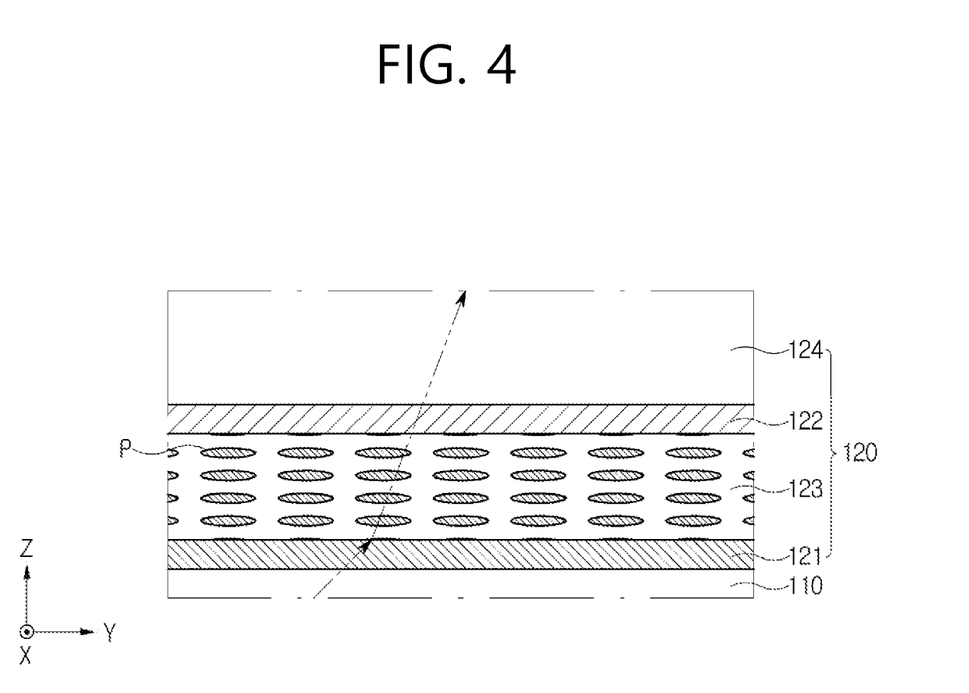
FIG. 4 is an enlarged view of an area of a first viewing angle control member in FIG. 3.

FIG. 3 illustrates a light path for a light path control device in a private mode. FIG. 4 is an enlarged view of an area of a first viewing angle control member in FIG. 3. In particular, FIGS. 3 and 4 show the light path of the side light in the light path control device.

With reference to FIGS. 3 and 4, the light path control device 10 operates in the state that no voltage is applied to the first electrode 121 and the second electrode 122 constituting the first viewing angle control member 120 of the light path control device 10. In this aspect, the liquid crystal molecules P within the liquid crystal layer 123 are aligned in the initial molecular orientation such that their long axis is parallel to the top surface (or bottom surface) of the light path control device 10 (parallel to the X-Y plane or horizontally).

In the state where the liquid crystal molecules P are aligned in the initial molecular orientation as such, the transmittance of the first viewing angle control member 120 is set to be the same as that of the substrate 110. Accordingly, the light incident from the substrate 110 to the first viewing angle control member 120 is transmitted through the first viewing angle control member 120 without being refracted or refracted at a small angle.

The transmitted light enters the second viewing angle control member 130. The light incident to the second viewing angle control member 130 is limited in its exit angle by the light shielding pattern 131. The light path entering the second viewing angle control member 130 is opened towards the front through the gap between the light shielding patterns 131 and blocked by the light shielding patterns 131 on the sides. Accordingly, the light entering the second viewing angle control member 130 may be controlled within the narrow angle range with respect to the front of the second viewing angle control member 130.

In this aspect, the emission angle of the light path control device 10 is limited in the front direction. The light emitted from the light path control device 10 has high brightness in the front direction and is restricted in its emission in the side directions. In this aspect, the private mode (mode 1) may be implemented since the emitted light is only visible to the user looking at it from the front and invisible to the user looking at it from the side.

Figure 5:
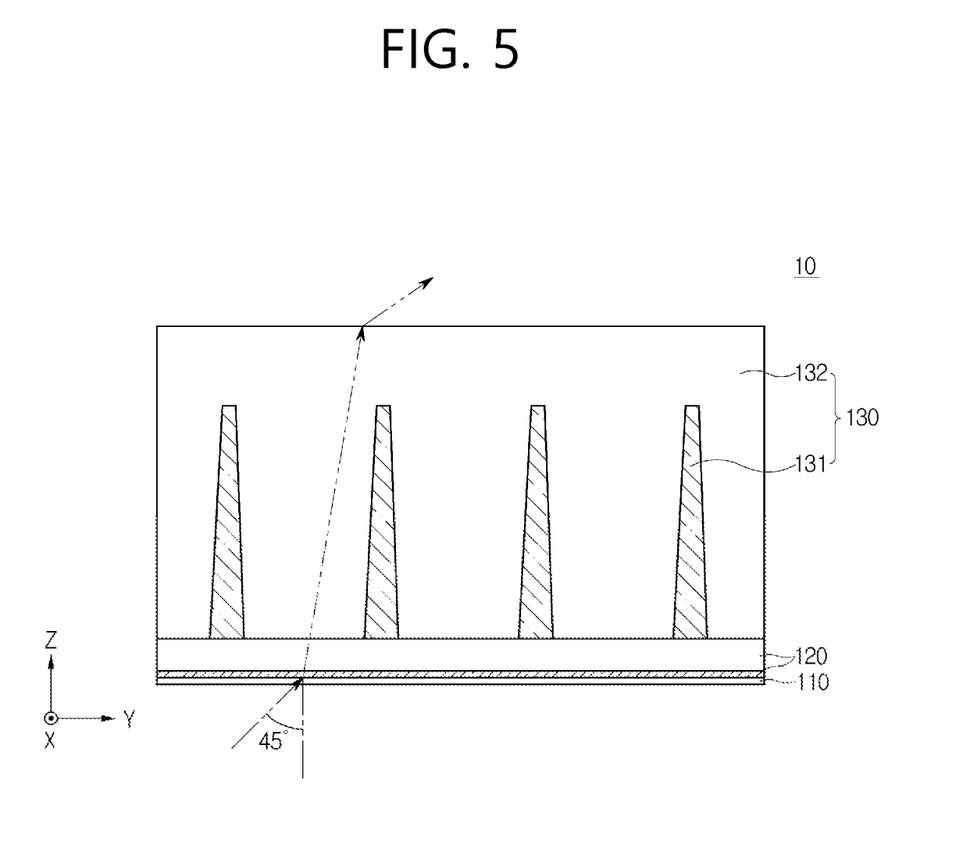
FIG. 5 illustrates a light path for a light path control device in a share mode.
Figure 6:
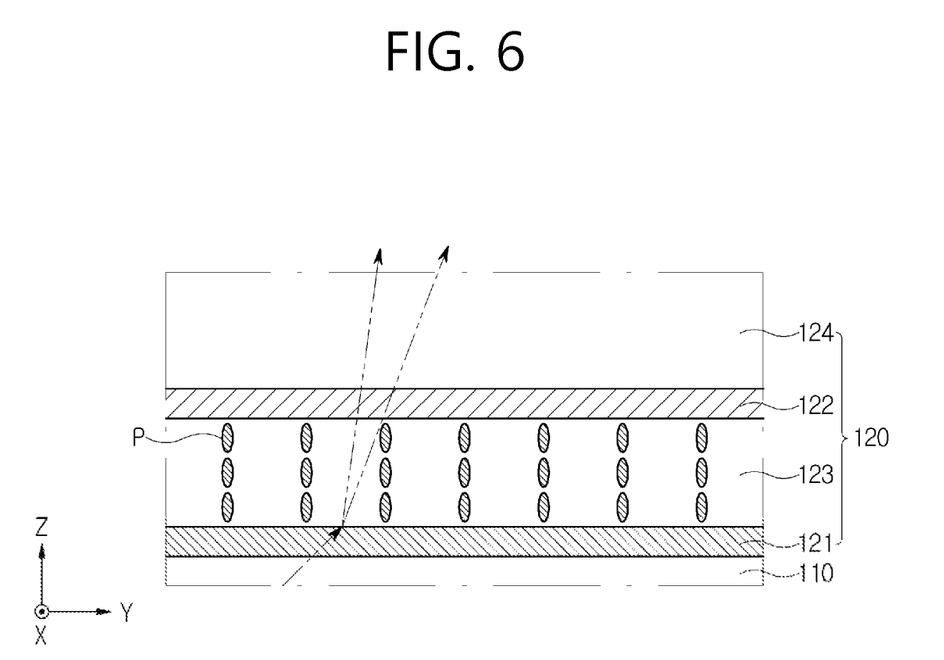
FIG. 6 is an enlarged view of an area of a first viewing angle control member in FIG. 5.

FIG. 5 illustrates a light path for a light path control device in a share mode. FIG. 6 is an enlarged view of an area of a first viewing angle control member in FIG. 5. In particular, FIGS. 5 and 6 show the light path of the lateral light in the light path control device.

With reference to FIGS. 5 and 6, the light path control device 10 operates in the state that a voltage is applied to the first electrode 121 and the second electrode 122 constituting the first viewing angle control member 120 of the light path control device 10. In this aspect, the liquid crystal molecules P within the liquid crystal layer 123 are generally aligned such that their long axis is parallel to the thickness direction (Z-axis direction) of the light path control device 10 along the direction of the electric field.

In the state where the liquid crystal molecules P are aligned in a predetermined molecular orientation as such, the transmittance of the first viewing angle control member 120 increases to be greater than that of the substrate 110. Accordingly, the light incident from the substrate 110 to the first viewing angle control member 120 may be greatly refracted and emitted adjacent to the normal line of the first viewing angle control member 120. For example, the light incident generally perpendicular to the bottom surface of the first viewing angle control member 120 (rear light) may be emitted generally perpendicular to the top surface of the first viewing angle control member 120. The light incident obliquely on the bottom surface of the first viewing angle control member 120 (side light) may be refracted greatly in the direction of the normal line (generally upward direction) and emitted obliquely.

The transmitted light enters the second viewing angle control member 130. The light incident to the second viewing angle control member 130 is limited in its exit angle by the light shielding pattern 131. The light path entering the second viewing angle control member 130 is opened towards the front through the gap between the light shielding patterns 131 and blocked by the light shielding patterns 131 on the sides. Accordingly, the light entering the second viewing angle control member 130 may be controlled within the narrow angle range with respect to the front of the second viewing angle control member 130.

For example, the light incident generally perpendicularly to the bottom surface of the second viewing angle control member 130 (rear light) may be emitted generally perpendicularly to the upper surface through the gaps between the light shielding patterns 131. The light incident at an incident angle greater than a predetermined angle (an angle formed between the normal line and the light, e.g., 45°) to the bottom surface of the second viewing angle control member 130 (lateral right) may be blocked by the light shielding pattern 131. The light incident at an angle smaller than a predetermined incident angle (lateral right) may be refracted adjacent to the normal line and obliquely emitted through the top surface through the gaps between the light shielding patterns 131.

In an aspect, the pattern cover layer 132 of the second viewing angle control member 130 has a refractive index greater than that of the outside air. Therefore, the light emitted from the second viewing angle control member 130 at a predetermined emission angle (an angle formed between the normal line and the light) may be refracted adjacent to the lateral directions of the second viewing angle control member 130. Accordingly, the light incident on the second viewing angle control member 130 may be open to the front and sides of the second viewing angle control member 130.

In this aspect, the emission angle of the light path control device 10 is open for both the front and the sides. In this aspect, the share mode (mode 2) may be implemented since the emitted light is visible to the users looking at it from both the front and the sides.

As described with reference to FIGS. 3 to 6, the light path control device 10 including the liquid crystal layer 123 according to an aspect implements the private mode and the share mode by using the liquid crystal molecules P to control the side light incident through the gaps between the light shielding patterns 131 other than using the scattering characteristics of the liquid crystal molecules P. Therefore, the light path control device 10 may reduce the scattering degree (haze) and solve the problem of brightness reduction in the front of screen (FOS) caused by scattering.

Figure 7A:
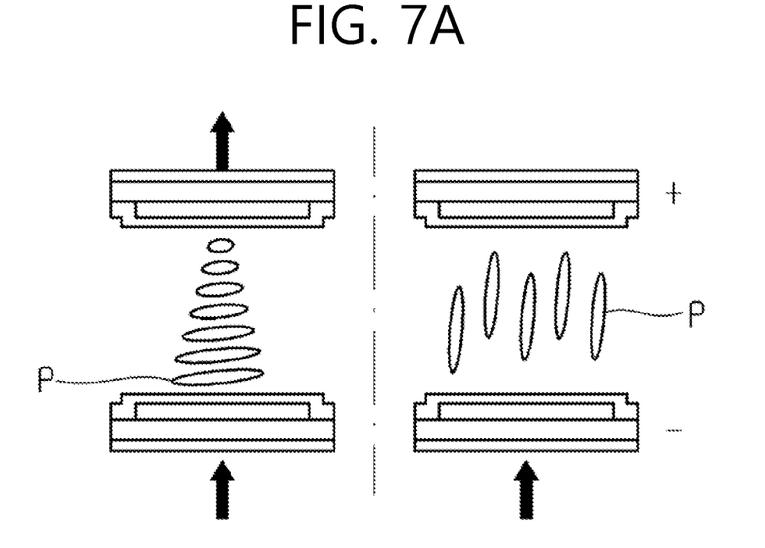
FIGS. 7A, 7B and 7C are diagrams illustrating a pre-tilt direction of liquid crystal in various aspects of the present disclosure.
Figure 7B:
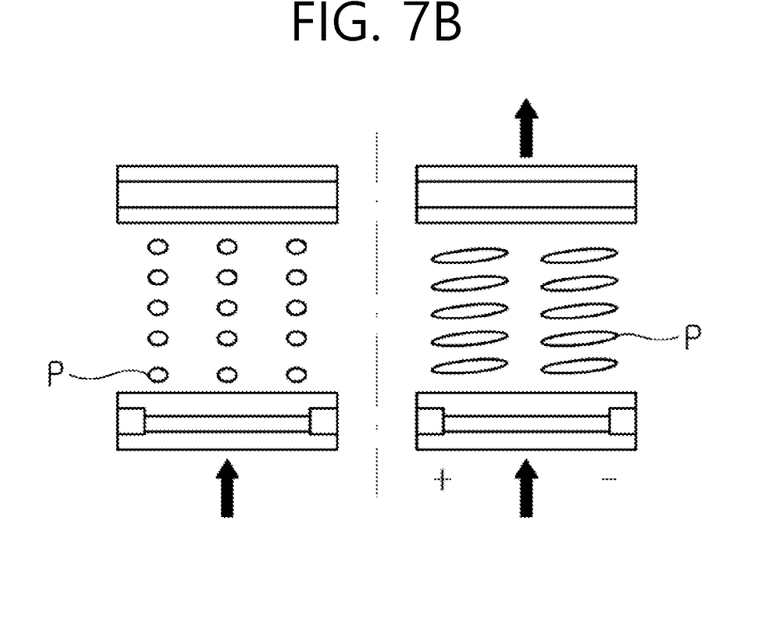
Figure 7C:
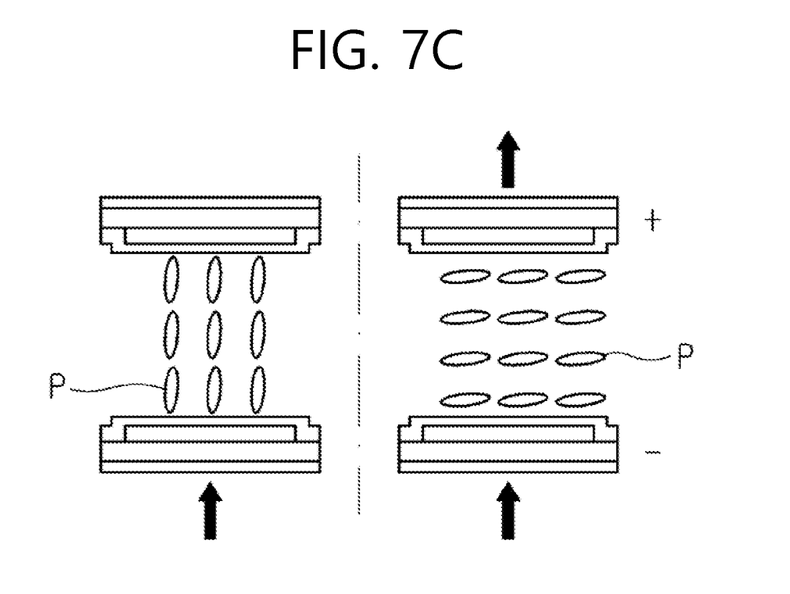
Figure 8A:
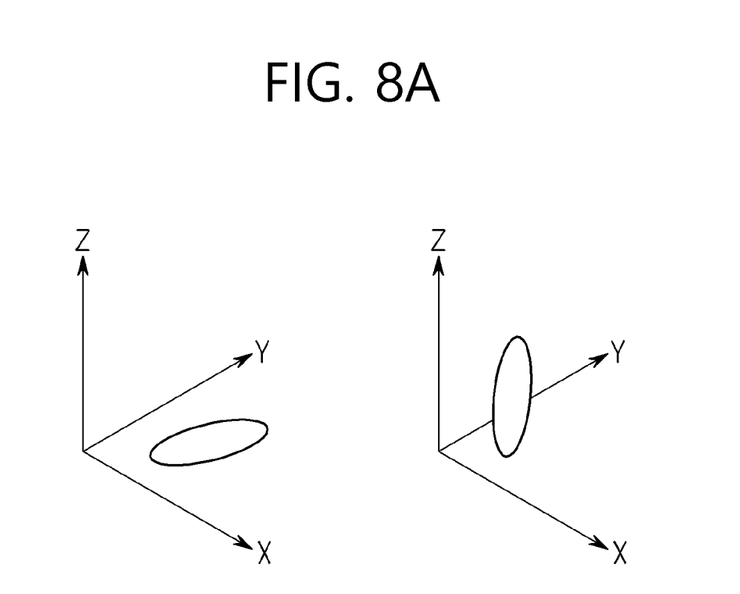
FIGS. 8A and 8B are diagram for explaining a pre-tilt direction of liquid crystal in a first viewing angle control member according to an aspect.
Figure 8B:
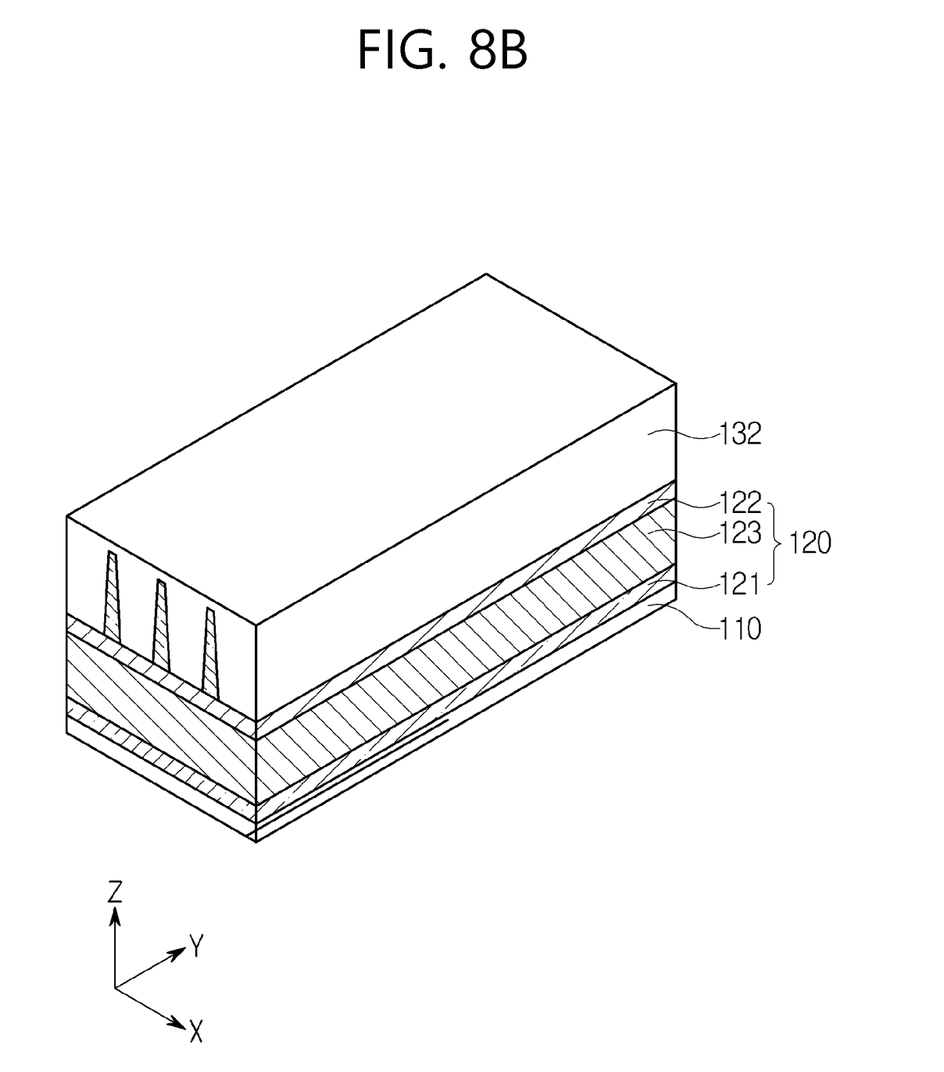

FIGS. 7A, 7B and 7C are diagrams illustrating a pre-tilt direction of liquid crystal in various aspects of the present disclosure. FIGS. 8A and 8B are diagrams for explaining a pre-tilt direction of liquid crystal in a first viewing angle control member according to an aspect of the present disclosure.

A panel using liquid crystal may include twisted nematic (TN) mode, in-plane switching (IPS) mode, and vertical alignment (VA) mode.

With reference to FIG. 7A, in the TN mode, when no electric field is applied, the initial molecular orientation of the liquid crystal molecules P may be horizontal. The liquid crystal molecules P may transmit the light incident from the backlight to represent bright colors. When a vertical electric field is formed, the liquid crystal molecules P are aligned vertically and may block light, representing a dark color.

With reference to FIG. 7B, in the IPS mode, when no electric filed is applied, the initial molecular orientation of the liquid crystal molecules P may be horizontal. The liquid crystal molecules P may block the light incident from the backlight to represent dark colors. When a horizontal electric field is formed, the liquid crystal molecules P rotate horizontally to allow light to pass through, representing bright colors.

With reference to FIG. 7C, in the VA mode, when no electric filed is applied, the initial molecular orientation of the liquid crystal molecules P may be vertical. The liquid crystal molecules P may block the light incident from the backlight to represent a pure black color. When a vertical electric field is formed, the liquid crystal molecules P are aligned horizontally to pass light, representing a white color.

With reference to FIGS. 8A and 8B, to control the side light in the first viewing angle control member 120 according to an aspect, it is desirable for the tilt direction of the liquid crystal molecules P to rotate about the Y-axis (or X-axis), as in the TN mode, rather than about the Z-axis as in the IPS mode. That is, the liquid crystal molecules P should switch between the horizontal and vertical directions rather than rotating horizontally.

When the liquid crystal molecules P are arranged horizontally, the side light is restricted to implement the private mode as described in FIGS. 3 and 4, and when the liquid crystal molecules P are rotated about the Y-axis to be arranged vertically, the side light is opened to implement the share mode as described with reference to FIGS. 5 and 6.

Figure 9A:
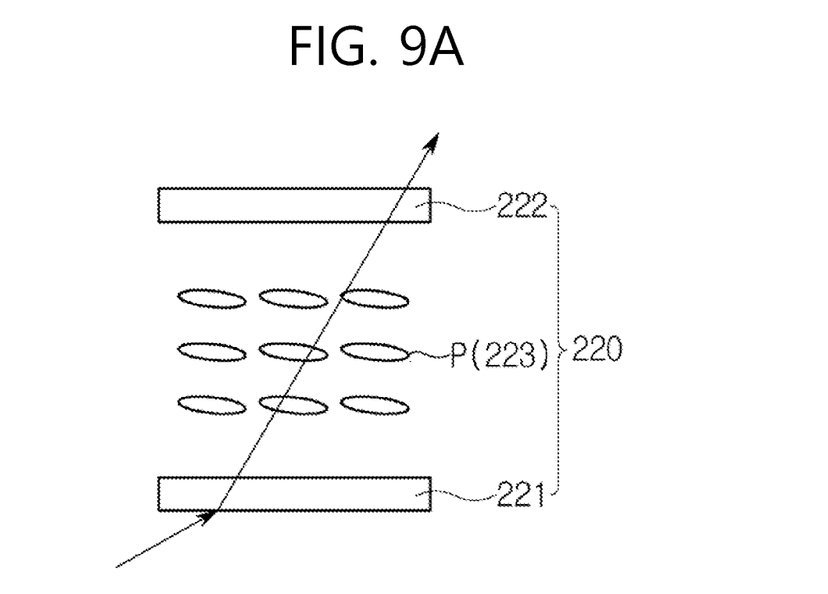
FIGS. 9A, 9B and 9C are cross-sectional views illustrating a first viewing angle control member according to another aspect of the present disclosure.
Figure 9B:
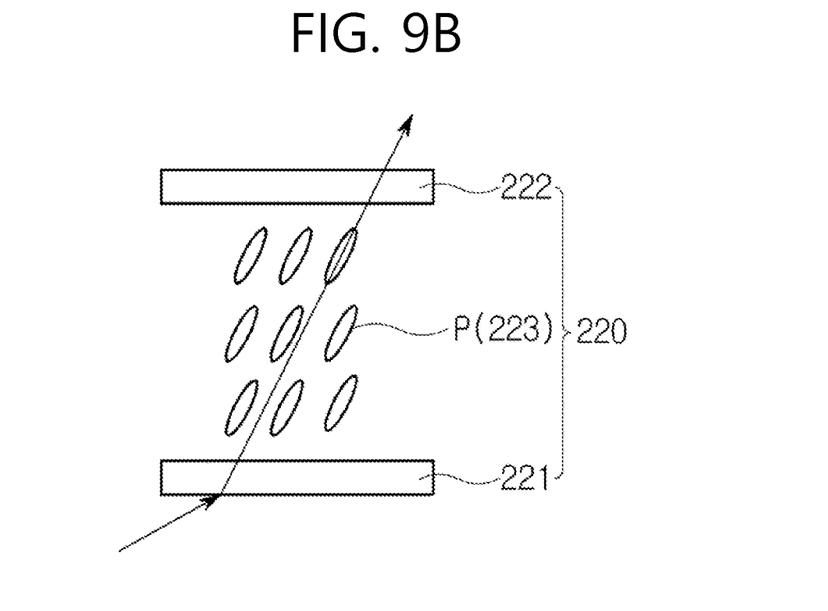
Figure 9C:
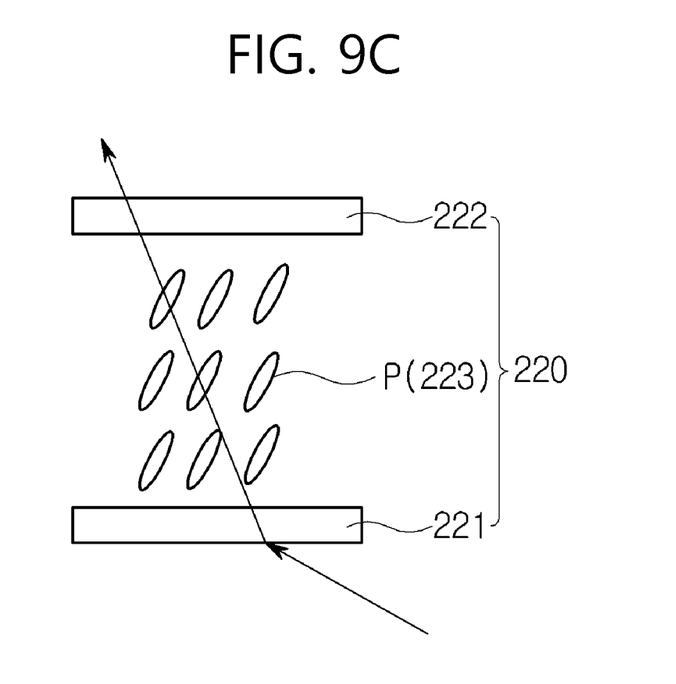

FIGS. 9A, 9B and 9C are cross-sectional views illustrating a first viewing angle control member according to another aspect of the present disclosure.

The first viewing angle control member 220 according to another aspect, the tilt angle of the liquid crystal molecules P is adjusted by controlling the magnitude of the voltage applied to the first electrode 221 and the second electrode 222.

In detail, with reference to FIG. 9A, when no voltage is applied to the first electrode 221 and the second electrode 222, the liquid crystal molecules P are aligned in the horizontal direction as the initial molecular orientation. In this case, the first viewing angle control member 220 operates in the dimming mode as described with reference to FIGS. 3 and 4.

With reference to FIGS. 9B and 9C, when a voltage is applied to the first electrode 221 and the second electrode 222, the liquid crystal molecules P are aligned at an arbitrary angle between the horizontal and vertical directions (tilted) depending on the strength of the electric field. In this case, the degree of tilt may be controlled by the magnitude of the applied voltage. In FIGS. 9B and 9C, the liquid crystal molecules P are tilted by about 45° with respect to the horizontal direction. In this case, as described with reference to FIGS. 5 and 6, the first viewing angle control member 220 may operate in a transparent mode.

When light is incident in one direction parallel to the long axis of the liquid crystal molecules P as shown in FIG. 9B, the movement path of light within the liquid crystal layer 223 becomes longer than that shown in FIG. 9A, which increases the transmittance of the liquid crystal layer 223, implementing the transparent mode for one side. Meanwhile, when light is incident in the opposite direction perpendicular to the long axis of the liquid crystal molecules P, the movement path of light within the liquid crystal molecules P is substantially similar to that shown in FIG. 9A, which cause no significant change of transmittance of the liquid crystal layer 223, maintaining the dimming mode for opposite side.

Accordingly, by controlling the direction of the electric field formed between the first and second electrodes 221 and 222 and the tilt direction of the liquid crystal molecules P accordingly, it is possible to open the viewing angle only for a predetermined side of the light path control device in the share mode.

Figure 10:
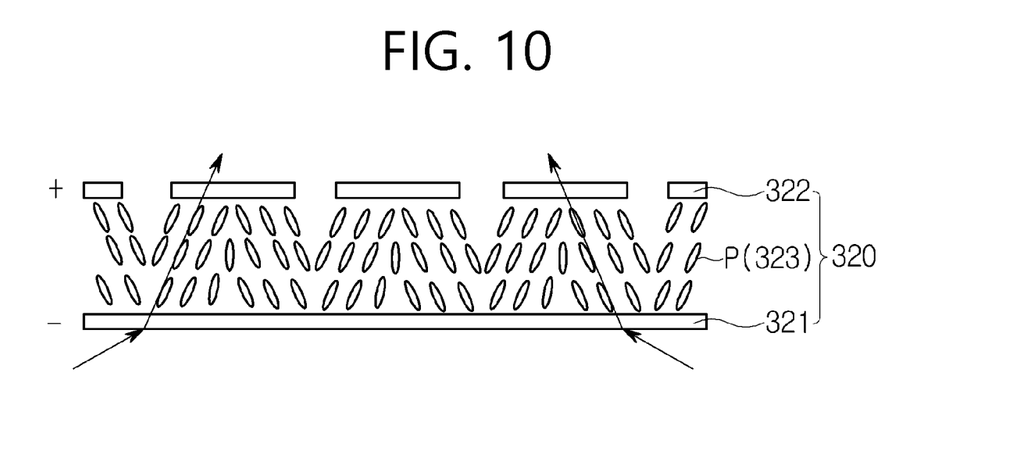
FIG. 10 is a cross-sectional view of a first viewing angle control member according to another aspect of the present disclosure.

FIG. 10 is a cross-sectional view of a first viewing angle control member according to another aspect.

With reference to FIG. 10, the first viewing angle control member 320 may include a first electrode 321, a second electrode 322, and a liquid crystal layer 323 interposed therebetween.

The first electrode 321 is configured in the form of a planar electrode. The second electrode 322 is composed of multiple patterns that are spaced apart from each other on a plane. The patterns of the second electrode 322 are formed to overlap with the first electrode 321 in at least one region. The liquid crystal layer 323 is interposed between the first electrode 321 and the second electrode 322.

In this aspect, different polarities of voltage may be applied to the patterns of the second electrode 322. In this way, it is possible to form electric fields of different directions between the first electrode 321 and the patterns of the second electrode 322. The liquid crystal molecules P in the liquid crystal layer 323 may be aligned in the oblique or vertical direction depending on the direction of the electric field formed between the first electrode 321 and the patterns of the second electrode 322.

As described with reference to FIGS. 9A, 9B and 9C, the first viewing angle control member 320 may be implemented to selectively open the viewing angle only in one direction through the tilting direction control. As shown in FIG. 10, by controlling the tilting direction of the liquid crystal molecules P in various ways via the patterned second electrode 322, it is possible to focus oblique light onto a predetermined area (e.g., the central area as depicted) of the light path control device 10, thereby improving the frontal luminance of the corresponding area.

Figure 11:
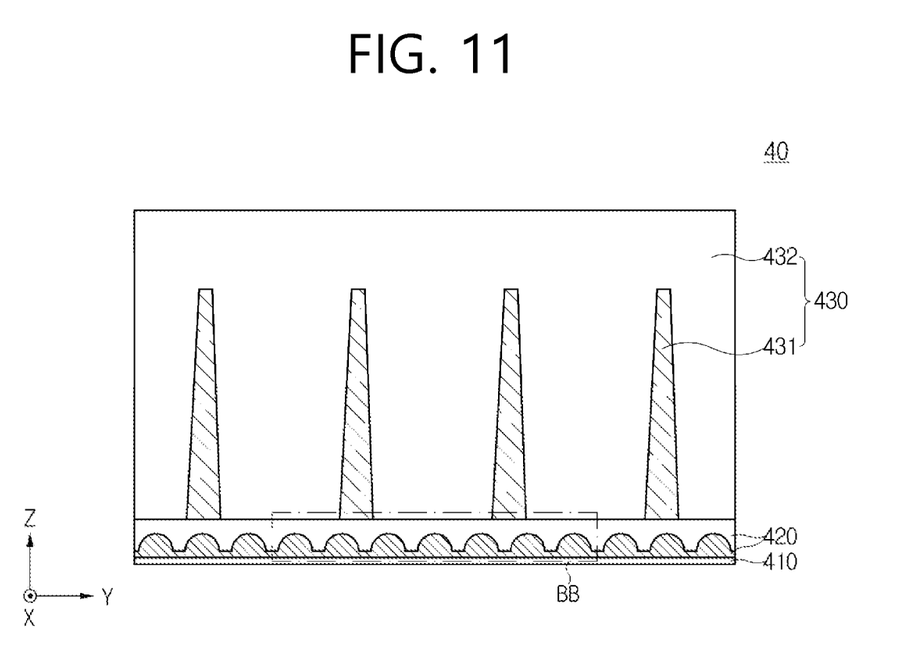
FIG. 11 is a cross-sectional view of a light path control device according to another aspect of the present disclosure.
Figure 12:
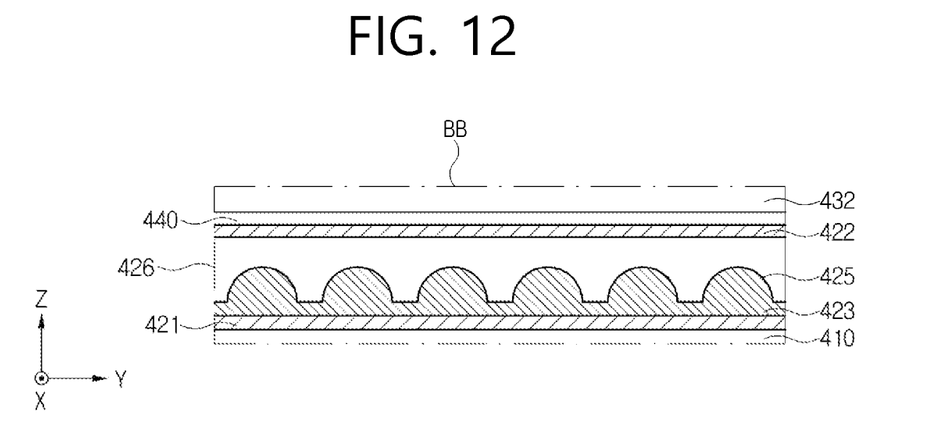
FIG. 12 is an enlarged view of area BB in FIG. 11.
Figure 13:
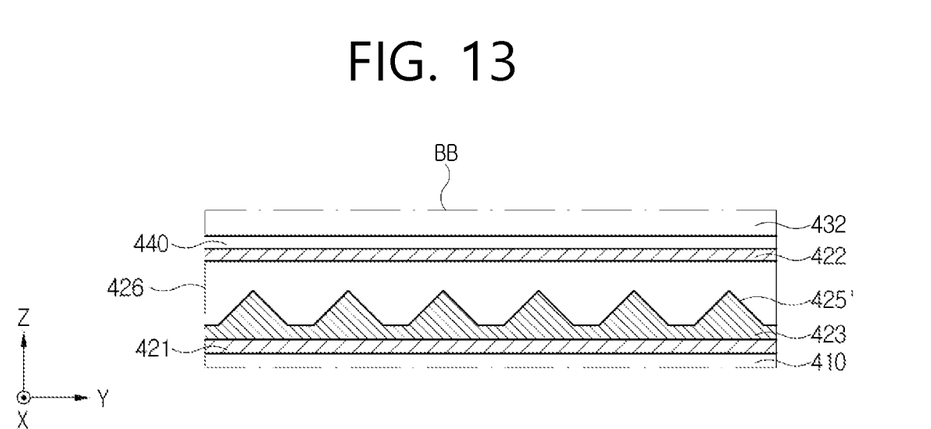
FIG. 13 illustrates a refractive pattern according to another aspect of the present disclosure.

FIG. 11 is a cross-sectional view of a light path control device according to another aspect. FIG. 12 is an enlarged view of area BB in FIG. 11. FIG. 13 illustrates a refractive pattern according to another aspect.

With reference to FIG. 11, a light path control device 40 according to another aspect may include a substrate 410, a first viewing angle control member 420, a second viewing angle control member 430. Comparing to the aspect shown in FIG. 1, the liquid crystal layer 423 of the first viewing angle control member 420 of the light path control device 40 includes a plurality of refractive patterns 425 formed on the top surface thereof.

The refractive patterns 425 may be formed adjacent to each other at predetermined intervals on a plane. The refractive patterns 425 may have a semi-cylindrical or semicircular shape with a semicircular cross-section as shown in FIGS. 11 and 12. In another aspect, the refractive patterns 425 may have a pyramid or triangular prism shape with a triangular cross-section as shown in FIG. 13. However, the shape of the refractive patterns 425 and 425' is not limited thereto. According to an aspect, the refractive patterns 425 may have a cross-section in the shape of an ellipse.

The refractive patterns 425 are filled with liquid crystal molecules P inside. The liquid crystal molecules P filled up to the refractive patterns 425 are aligned in the initial molecular orientation through an alignment layer or the like (not shown) and may be realigned, when an electric field is formed between the first electrode 421 and the second electrode 422, in a predetermined molecular orientation according to the direction of the electric field. As a result, the refractive index of the liquid crystal layer 423 changes. As the refractive index of the liquid crystal layer 423 changes, the outgoing path of light entering from the substrate 410 to the first viewing angle control member 420 may be controlled.

In this case, light may be concentrated and scattered by the refractive pattern 425 and emitted toward the front and sides. In the share mode, it is possible to improve the luminance at the front and side areas through the concentration of light to the front and the scattering of light to the sides via the refractive patterns 425.

The refractive patterns 425 may be covered by a cover layer 426. The cover layer 426 may support and protect the underlying refractive patterns 425 and may flatten the curvature caused by the irregularities on the top surface of the refractive patterns 425. The cover layer 426 may be formed of, but is not limited to, a transparent polymer such as PET.

The second viewing angle control member 430 may be attached to the first viewing angle control member 420 via an adhesive material 440 such as optically clear adhesive (OCA).

The light path control device according to aspects is capable of reducing brightness degradation caused by scattering in the viewing angle control member that uses liquid crystal.

The light path control device according to aspects is capable of implementing a private mode and a share mode through side light control and achieving high quality black color in a dimming mode without relying on the scattering characteristics of the liquid crystal.

Although aspects of this disclosure have been described above with reference to the accompanying drawings, it will be understood that the technical configuration of the disclosure described above may be implemented in other specific forms by those skilled in the art without changing the technical concept or essential features of the present disclosure. Therefore, it should be understood that the aspects described above are exemplary and not limited in all respects. Furthermore, the scope of the present disclosure is defined by the claims set forth below, rather than the detailed description above. In addition, it should be understood that all modifications or variations derived from the meaning and scope of the claims and their equivalent concept are included within the scope of the disclosure.

What is claimed is:

1. A light path control device comprising:
   a substrate;
   a first viewing angle control member on the substrate comprising a first electrode, a second electrode, and a liquid crystal layer between the first electrode and the second electrode; and
   a second viewing angle control member on the first viewing angle control member comprising light shielding patterns patterned at predetermined intervals,
   wherein the liquid crystal layer is configured, in a first mode, to have a first refractive index equal to a refractive index of the substrate and transmit a first side light incident through the substrate without refraction and, in a second mode, to have a second refractive index greater than a refractive index of the substrate and refract a second side light incident through the substrate adjacent to a normal line of the first viewing angle control member and transmit the refracted light.

2. The light path control device of claim 1, wherein the first side light transmitted through the first viewing angle control member in the first mode is restricted in lateral emission thereof by the light shielding patterns of the second viewing angle control member, restricting a side viewing angle.

3. The light path control device of claim 1, wherein the second side light transmitted through the first viewing angle control member in the second mode is emitted to a top surface through a gap between the light shielding patterns of the second viewing angle control member.

4. The light path control device of claim 3, wherein the second viewing angle control member comprises a pattern cover layer covering the light shielding patterns, the pattern cover layer having a refractive index greater than that of the outside of the light path control device.

5. The light path control device of claim 4, wherein the second side light emitted to the top surface is emitted toward the sides of the light path control device, opening a side viewing angle.

6. The light path control device of claim 1, wherein the liquid crystal layer comprises liquid crystal molecules, which are aligned in a horizontal direction in the first mode and rotate, in the second mode, about a predetermined axis to be aligned in a vertical direction.

7. The light path control device of claim 6, wherein the liquid crystal molecules are aligned at an arbitrary angle between the horizontal direction and the vertical direction based on the strength of an electric field between the first and second electrodes.

8. The light path control device of claim 7, wherein the liquid crystal layer have the second refractive index for a third side light incident parallel to a long axis of the liquid crystal molecules aligned at the arbitrary angle based on the electric field being applied, and the first refractive index for a fourth side light incident perpendicular to the long axis of the liquid crystal molecules aligned at the arbitrary angle.

9. The light path control device of claim 6, wherein the first electrode is configured in the form of a planar electrode and the second electrode is configured to include a plurality of patterns spaced apart from each other on a plane.

10. The light path control device of claim 9, wherein the plurality of patterns are applied with different polarities of voltage, and the liquid crystal molecules are tilted to different directions based on a direction of an electric field between the plurality of patterns and the first electrode.

11. The light path control device of claim 1, wherein the liquid crystal layer comprises a plurality of refractive patterns on a top surface thereof.

12. The light path control device of claim 11, wherein each of the plurality of refractive patterns has a semicircular or triangular cross-section.

13. The light path control device of claim 1, wherein the first viewing angle control member further comprises a base layer disposed on a top surface of the second electrode.

14. The light path control device of claim 13, further comprising an adhesive member bonding the first viewing angle control member and the second viewing angle control member, wherein the adhesive member has a refractive index equal to that of the base layer.

* * * * *